United States Patent
Remmert et al.

(10) Patent No.: US 11,649,297 B2
(45) Date of Patent: May 16, 2023

(54) THERMOPLASTIC STARCH AND METHOD FOR PREPARING THE SAME

(71) Applicant: Green Dot Bioplastics Inc., Emporia, KS (US)

(72) Inventors: Mark Remmert, Emporia, KS (US); Michael Parker, Lawrence, KS (US)

(73) Assignee: Green Dot Bioplastics Inc., Emporia, KS (US)

( * ) Notice: Subject to any disclaimer, the term of this patent is extended or adjusted under 35 U.S.C. 154(b) by 398 days.

(21) Appl. No.: 16/818,206

(22) Filed: Mar. 13, 2020

(65) Prior Publication Data

US 2020/0291137 A1   Sep. 17, 2020

Related U.S. Application Data

(60) Provisional application No. 62/819,006, filed on Mar. 15, 2019.

(51) Int. Cl.
| | | |
|---|---|---|
| *C08B 30/00* | (2006.01) | |
| *B29C 48/00* | (2019.01) | |
| *B29C 48/40* | (2019.01) | |
| *B29L 7/00* | (2006.01) | |

(52) U.S. Cl.
CPC ............ *C08B 30/00* (2013.01); *B29C 48/022* (2019.02); *B29C 48/40* (2019.02); *B29K 2003/00* (2013.01); *B29L 2007/008* (2013.01)

(58) Field of Classification Search
CPC ..... B29C 48/0013; B29C 45/70; B29C 45/46; B29C 48/40; B29C 48/022; C08B 30/00
See application file for complete search history.

(56) References Cited

U.S. PATENT DOCUMENTS

| | | |
|---|---|---|
| 5,736,209 A | 8/1998 | Andersen et al. |
| 6,136,097 A | 10/2000 | Lorcks et al. |
| 6,231,970 B1 | 5/2001 | Andersen et al. |
| 7,350,960 B2 | 4/2008 | Ziegenfus et al. |
| 8,137,731 B2 | 3/2012 | Pater et al. |
| 8,329,977 B2 | 12/2012 | Wang et al. |
| 8,828,432 B2 | 9/2014 | van Lengerich |
| 2007/0082982 A1 | 4/2007 | Noda et al. |
| 2009/0104314 A1 | 4/2009 | Dellinger et al. |
| 2009/0160095 A1 | 6/2009 | Narayan et al. |
| 2016/0130479 A1 | 5/2016 | Buwalda et al. |
| 2016/0340478 A1 | 11/2016 | Pun |
| 2017/0342302 A1 | 11/2017 | Salehpour et al. |

FOREIGN PATENT DOCUMENTS

| | | |
|---|---|---|
| CN | 107206619 | 9/2017 |
| KR | 20020048353 | 6/2002 |
| KR | 20020077381 | 10/2002 |
| WO | 2010065750 | 6/2010 |

OTHER PUBLICATIONS

Willett, et al., "Rheology of thermoplastic starch: effects of temperature, moisture content, and additives on melt viscosity", Polymer Engineering and Science, Jan. 1, 1995 (6 pages).
Steel, et al., "Thermoplastic Extrusion in Food Processing", Thermoplastic Elastomers, Mar. 2012 (28 pages).
International Search Report and Written Opinion in corresponding PCT/US2020/022549, dated May 20, 2020.
Extended Search Report in corresponding European Patent Application Serial No. 20772595.3, dated Nov. 9, 2022.

*Primary Examiner* — Stella K Yi
(74) *Attorney, Agent, or Firm* — Hovey Williams LLP

(57) ABSTRACT

Thermoplastic starch materials and methods of making the same are provided. The methods involve mixing a starch material, plasticizer and water in a low-shear mixer under conditions that will result in substantial gelatinization of the starch material. The melt formed within the mixer is discharged into an extruder for final processing. The methods prevent degradation of the starch material thereby resulting in the formation of a thermoplastic starch material having high strength, due at least in part to the preservation of the molecular weight characteristics of the starch, and improved elasticity due the ability to use higher water contents than conventional processes.

20 Claims, No Drawings

THERMOPLASTIC STARCH AND METHOD FOR PREPARING THE SAME

RELATED APPLICATION

This application claims the benefit of U.S. Provisional Patent Application No. 62/819,006, filed Mar. 15, 2019, which is incorporated by reference herein in its entirety.

BACKGROUND OF THE INVENTION

Field of the Invention

The present invention is generally directed toward a thermoplastic starch material and methods of making the material that involve a low-shear cooking stage that is located upstream from extrusion apparatus from which the material is finally obtained. The methods of the present invention permit the efficient manufacture of a high-quality thermoplastic starch product from low-cost starting materials.

Description of the Prior Art

Historically, the most common way of producing thermoplastic starch (TPS) was to use a traditional twin-screw extruder (TTSE). Starch, water, and plasticizer were added to the TTSE and the heat generated by heating elements in the barrel and friction in the screws caused gelatinization of the starch thereby creating the thermoplastic material. This process involved generation of high pressures and high shear conditions within the extruder that ultimately resulted in the loss of starch molecular weight, which negatively affected the physical strength of the thermoplastic starch material. It was discovered that this untoward effect could be mitigated by increasing the water content of the melt. But, there is a practical limit to the amount of water one can use and still be able to cut the material into pellets upon leaving the extruder. Too high of a water content makes the polymer too soft. At the same time the materials and conditions used can cause quite a bit of wear on the machine often resulting in the use of more expensive materials to build the extruder. This adds to the already high capital cost of the TTSE equipment.

Other processes to make TPS have been developed because of these problems. One such process is described in U.S. Pat. No. 6,136,097. These solutions often involve complicated processes with many steps and many pieces of downstream equipment needed. They all require large amounts of water to be added to the starch in the cooking phase of the process, which subsequently be removed. Once this water is removed, further processing must occur in order to place the TPS into a useable form.

SUMMARY OF THE INVENTION

Certain embodiments of the present invention overcome the above problems through the use of a continuous mixer to provide a simple, efficient, low-cost method to make thermoplastic starch products with higher quality and lower cost than previous extrusion processes.

According to one embodiment of the present invention there is provided a process for producing thermoplastic starch. The process comprises mixing within a continuous mixer a composition comprising from about 50% to about 75% by weight starch, from about 15% to about 30% by weight of a plasticizer, and from about 5% to about 20% by weight water. The mixing step includes operating the mixer at a temperature of from about 150° F. to about 200° F. so as to gelatinize the starch and form a melt. The melt is then discharged from the continuous mixer and fed into a single screw extruder. The extruder is operated at a temperature of from about 150° F. to about 250° F. The melt is then extruded through a die at a die pressure of from about 1500 psi to about 2500 psi.

According to yet another embodiment of the present invention there is provided a process for producing thermoplastic starch. The process comprises mixing within a twin-screw, heated continuous mixer a composition comprising from about 50% to about 75% by weight of a non-pregelatinized native or modified starch, from about 15% to about 30% by weight of glycerin, and from about 5% to about 20% by weight water. The mixing step includes operating the mixer at a temperature of from about 150° F. to about 200° F. so as to gelatinize the starch and form a melt. The melt is discharged from the continuous mixer as a rope and fed directly into a single screw extruder. The single screw extruder is operated at a temperature of from about 150° F. to about 250° F. The melt is then extruded through a die at a die pressure of from about 1500 psi to about 2500 psi. The mixing and extruding steps do not substantially change the molecular weight of the starch as added to the mixer.

DETAILED DESCRIPTION OF THE PREFERRED EMBODIMENT

Embodiments of the present invention are generally directed toward a process for producing thermoplastic starch (TPS). The TPS can be formed into pellets, sheets, or films to make articles, or the TPS can be blended with other plastic materials, such as biodegradable plastics, prior to being formed into finished products. In particular embodiments, the processes according to the present invention comprise, consist of, or consist essentially of two steps. In the first step, components comprising starch, one or more plasticizers, and water are mixed within a continuous mixer under heat. In the second step, the melt that is discharged from the mixer is extruded to form the TPS.

As explained in greater detail below, the present invention advantageously provides a process whereby inexpensive uncooked native or modified starch can be combined with a plasticizer and cooked prior to being extruded. It has been discovered that cooking or gelatinizing the starch upstream of the extruder imparts favorable characteristics to the TPS, such as enhanced elongation characteristics, without materially impacting the molecular weight characteristics of the starch, which would result in a decrease in the strength of the TPS. As used herein, the term "gelatinized" refers to the cooking of the starch in which the starch molecules are opened up so as to permit water molecules to penetrate into the starch. The process of gelatinization transforms the starch molecules from their native or crystalline form into an amorphous state.

In certain embodiments, the continuous mixer comprises an elongate twin-screw mixer, and preferably of the type shown and described in U.S. Pat. No. 7,350,690, incorporated by reference herein in its entirety. In particularly preferred embodiments, each of the mixer screws comprises a Lowenherz thread flight located upstream from a standard screw flight. Also, in certain embodiments, the continuous mixer has a compression ratio of about 3:1. In certain embodiments, the L/D ratio (ratio of length to diameter for the mixing screw) of the mixer is approximately 10:1 or less.

Generally, the continuous mixer is configured to receive both dry and liquid ingredients, blend or mix those ingredients under added heat and then discharge the mixed ingredients through an adjustable-opening outlet. By increasing the size of the mixer outlet, the material in the mixer comes out more freely thereby subjecting it to less heat, back pressure, and mixing shear. However, if more heat and mixing is required, the opening can be adjusted smaller. Furthermore, the amount of mixing and shear-induced heat can also be adjusted by the design of the screws in the barrel.

The starch component that is fed to the mixer comprises a starch obtained from plant sources such as cereal plants (e.g., corn, wheat, rice, barley, triticale and sorghum), tubers (e.g., potato and cassava), legumes (e.g., peas, soybeans, and beans), or derived from other non-food cellulosic materials and biomass. Most preferably, the starch is a native wheat, corn or potato starch. However, it is within the scope of the present invention for modified starches to be employed (e.g., pregelatinized starch or high amylose starch) so long as the modification to the starch does not interfere with its ability to be gelatinized within the mixer.

According to certain embodiments of the present invention, the plasticizer component may be any suitable material known to improve the softness of a polymeric resin material. Exemplary plasticizers include various modified or unmodified vegetable oils, fatty acids, polyols, ethers, thioethers, inorganic and organic esters, acetals, and derivatives thereof. Particularly preferred plasticizers include organic acid-derived plasticizers, especially organic acid ester plasticizers (e.g., citric acid-derived plasticizers), adipic acid derivatives such as tridecyl adipate, benzoic acid derivatives such as isodecylbenzoate, and glycerin.

The components to be blended within the mixer can also include one or more optional solid or liquid ingredients such as those selected from the group consisting of glycerol monostearate, metal stearates, internal or external lubricants, natural fibers, fillers, reinforcing materials, additional starch having a higher or lower molecular weight than the primary starch component, and sugars.

In preferred embodiments of the present invention, the components may be added and blended within the mixer at the approximate levels described in Table 1.

TABLE 1

| Component | Broad range (wt. %) | Intermediate range (wt. %) | Narrow range (wt. %) |
| --- | --- | --- | --- |
| Starch | 40-85% | 50-75% | 55-70% |
| Plasticizer | 10-40% | 15-30% | 10-25% |
| Water | 2.5-30% | 5-20% | 7.5-15% |
| Optional components | 0-25% | 0.5-20% | 1-15% |

In certain embodiments, the components are mixed within the mixer at a temperature of from about 150° F. to about 200° F. and a mixer screw speed of from 140 to 250 rpm, preferably from 150 to 200 rpm, so as to gelatinize the starch and form a melt. The pressure within the mixer is at or near atmospheric pressure. In certain embodiments, the pressure within the mixer is less than 5 bar, less than 3 bar, less than 2 bar, about 1 bar, or from about 1 bar to about 2 bar. The mixer imparts relatively low shear to the melt so as not to overcook the starch or materially affect the molecular weight of the starch. In certain embodiments, the shear rates during mixing are from about 590 $s^{-1}$ to about 280 $s^{-1}$. Also, in certain embodiments, the amount of mechanical energy input to the components within the mixer is from about 75 to about 150 Wh/kg, from about 85 to about 145 Wh/kg, or from about 90 to about 130 Wh/kg. In other embodiments, however, the amount of mechanical energy added to the components within the mixer is less than 100 J/g, or less than 90 J/g, or less than 80 J/g. As indicated above, the mixer's primary function is to cook or gelatinize the starch and most of the starch gelatinization taking place in the manufacturing process occurs within the mixer. It is preferable to cook the starch within the mixer to at least 70% completion, preferably at least 80%, or more preferably at least 90%. In certain embodiments, the starch is completely gelatinized (maximum possible gelatinization achievable) within the mixer.

The melt exits the mixer barrel through an adjustable opening as a thick strand or rope. The rope of homogeneous, melted material then travels a short distance into the feed throat of an extruder. The melt temperature of the rope being discharged from the mixer is preferably from about 190° F. to about 200° F. The rope preferably travels a relatively short distance (e.g., less than 36 inches) into the inlet of an extruder. During this short time, at least some of the excess moisture within the melt, if any, flashes off.

In preferred embodiments, the extruder used in this second step of the process is a common single screw extruder that is sized to accommodate the output of the mixer, although it is within the scope of the present invention for other types of extruders and screw configurations to be employed. The extruder provides additional heat and time necessary to complete the gelatinization of the starch, which began in the mixer, and can be set up to vent the material ensuring the removal of excess moisture and compression of the melt. The action of the extruder also ensures that the TPS material has the correct product texture. The loss of excess moisture means that strands of completely gelatinized starch can be produced that are able to be cut into pellets right at the die or readily produce any extrudable shape (profiles, sheets, films, etc.) without any further downstream treatment or processing needed, such as disclosed in U.S. Pat. No. 6,136,097, which is incorporated by reference herein in its entirety.

In certain embodiments, the extruder barrel temperature is set at from about 130° F. to about 170° F., or from about 140° F. to about 160° F., or about 150° F., but could be operated over a much broader range such as from about 150° F. to about 250° F., preferably from about 180° F. to about 220° F. The melt is extruded through a die at a pressure of from about 1500 psi to about 2500 psi, preferably from about 1800 psi to about 2200 psi. In certain embodiments, the die temperature of the extrudate is from about 175° F. to about 220° F., from about 185° F. to about 205° F., or about 190° F. The extruder die may be configured to form the extruded melt into a sheet or film, or prepare the extruded melt for passage to a pelletizer whereby the extruded melt is formed into pellets. In certain embodiments, some water may be driven off from the melt during passage through the die; however, most commonly no released steam is visibly observed. In certain embodiments, the L/D ratio (ratio of length to diameter for the extruder screw) for the extruder is approximately 10:1 or less.

It is an advantage of certain embodiments of the present invention for the mixing and extruding steps to not substantially alter the molecular weight of the starch component as originally added to the mixer. In preferred embodiments, the change in starch number average molecular weight, weight average molecular weight, peak molecular weight, and polydispersity (Mw/Mn) is less than 5%, less than 3%, or less than 1%. In particular embodiments, the starch present within the TPS has a molecular weight (Mw, Mn or Mp) that is at least 90%, at least 95%, or at least 98% of the molecular weight of the starch that is originally added to the mixer. In certain embodiments, the finished TPS product exiting the extruder is clear or translucent. However, it is within the scope of the present invention for colorants to be added to the melt during mixing or prior to extrusion if desired. It is also an advantage of the certain embodiments of the present invention that venting (e.g., vacuum venting) and flashing of moisture from within the material being mixed and extruded is not required.

The TPS produced according to the present invention can be used by itself to create articles, or it can be blended with other plastics and polymers, especially biodegradable polymers, and then formed into articles using various means known to those of skill in the art, such as injection molding. The further modifying or complexing polymers with which the TPS can be blended include plasticizers, such as polyols and polyol derivatives, esters, ester-modified thermoplastic cellulosic polymers, urethane pre-polymers, di-acids, or other compounds which can impart desired characteristics to the starch component. In other embodiments, the modifying or complexing polymers may comprise polycaprolactones (PCLs), aromatic copolyesters (PBATs), aliphatic polyesters (PBSs), water-soluble polymers such as polyvinyl alcohol (PVOH), or polyesters of renewable origin such as polylactates (PLAs), microbial polyhydroxyalkanoates (PHAs) or cellulose derivatives.

In addition to the above, in certain embodiments it is preferred that no fibers or fibrous materials are added to the materials being processed within the mixer and/or extruder. In certain embodiments, it is preferred that the materials being processed within the mixer and/or extruder do not comprise wood fibers, wood flour, or any other type of cellulosic materials. In certain embodiments, it is preferred that the materials being processed within the mixer and/or extruder do not comprise inorganic mineral fillers.

EXAMPLES

The following examples set forth preferred thermoplastic starch materials and methods of making said materials according to the present invention. It is to be understood, however, that these examples are provided by way of illustration and nothing therein should be taken as a limitation upon the overall scope of the invention.

Example 1

In this example, TPS materials were made from wheat starch (MIDSOL 50 from MGP Ingredients), glycerin (99.7% industrial/technical grade from KIC Group), and water. The components were mixed and extruded using a continuous mixer and a single screw extruder, Model 2FR from Technical Process and Engineering, Inc. The mixer configuration is generally described in U.S. Pat. No. 7,350,960. The dry components were added to the continuous mixer using a loss-in-weight powder feeder from Brabender. The water was added using a peristaltic pump for liquids.

The temperature of the continuous mixer was set at 188° F. at the feed section and 190° F. at the discharge. The mixer screw speed was set at 240 rpm. The rotors used in the mixer were low-shear TPEI #17 rotors. The glycerin and the water were mixed together at a 67% by weight glycerin, 33% by weight water ratio to form a solution. The starch was fed into the mixer at 30 lbs/hr, and the liquid solution at 25 lbs/hr. The resulting mixture comprised 54.5% by weight starch, 30.5% by weight glycerin, and 15% by weight water.

This mixture passed through the continuous mixer at the above conditions and exited as a continuous melt rope. The temperature of the melt rope was measured several times and was found to be between 190° F. and 200° F. This melt rope was directed into the single screw extruder, which employed a 3:1 compression screw. The temperature of the single screw extruder was set at 220° F. on the barrel and 230° F. at the die. The screw speed was 10 rpm, and the thermoplastic starch was extruded into strands that were then strand pelletized without using a water bath.

Example 2

In this example, TPS materials were made from wheat starch (MIDSOL 50 from MGP Ingredients), glycerin (99.7% industrial/technical grade from KIC Group), and water. The components were mixed and extruded using a continuous mixer and a single screw extruder, Model 2FR from Technical Process and Engineering, Inc. The mixer configuration is generally described in U.S. Pat. No. 7,350,960. The dry components were added to the continuous mixer using a loss-in-weight powder feeder from Brabender. The water was added using a peristaltic pump for liquids.

The temperature of the continuous mixer was set at 155° F. at the feed section and 180° F. at the discharge. The screw speed was set at 145 rpm. The rotors used in the mixer were low-shear TPEI #17 rotors. The glycerin and the water were mixed together at a 67% by weight glycerin, 33% by weight water ratio to form a solution. The starch was fed into the mixer at 35 lbs/hr, and the liquid solution at 15 lbs/hr. The resulting mixture comprised 70% by weight starch, 20.1% by weight glycerin, and 9.9% by weight water.

This mixture passed through the continuous mixer at the above conditions and exited as a continuous melt rope. The temperature of the melt rope was measured several times and was found to be between 200° F. and 210° F. This melt rope was directed into the single screw extruder, which employed a 3:1 compression screw. The temperature of the single screw extruder was set at 150° F. on the barrel and 200° F. at the die. The screw speed was 8 rpm. A die pressure of 2100 psi was obtained using a die with three, 0.125-inch diameter holes. A hot face pelletizer was attached on the face of the die, and the extrudate was pelletized.

Example 3

In this example, TPS materials were made from pre-gelatinized wheat starch (PREGEL 10 from MGP Ingredients), glycerin (99.7% industrial/technical grade from KIC Group), and water. The components were mixed and extruded using a continuous mixer and a single screw extruder, Model 2FR from Technical Process and Engineering, Inc. The mixer configuration is generally described in U.S. Pat. No. 7,350,960. The dry components were added to the continuous mixer using a loss-in-weight powder feeder from Brabender. The water was added using a peristaltic pump for liquids.

The temperature of the continuous mixer was set at 150° F. at the feed section and 185° F. at the discharge. The screw speed was set at 117 rpm. The rotors used in the mixer were low-shear TPEI #17 rotors. The glycerin and the water were mixed together at a 67% by weight glycerin, 33% by weight water ratio to form a solution. The starch was fed into the mixer at 35 lbs/hr, and the liquid solution at 15 lbs/hr. The resulting mixture comprised 70% by weight starch, 20.1% by weight glycerin, and 9.9% by weight water.

This mixture passed through the continuous mixer at the above conditions and exited as a continuous melt rope. The temperature of the melt rope was measured several times and was found to be steady at about 190° F. This melt rope was directed into the single screw extruder, which employed a 3:1 compression screw. The temperature of the single screw extruder was set at 180° F. on the barrel and 200° F. at the die. The screw speed was at 12 rpm. A die pressure of 1,900 to 2,100 PSI was obtained using a die with three, 0.125-inch diameter holes. A hot face pelletizer was attached on the face of the die, and the extrudate was pelletized.

Molecular Weight Evaluation

In order to determine if any major change in the molecular weight of the starch occurred due to the TPS manufacturing process, two samples were sent to an independent lab for testing. The first sample was the raw wheat starch used in Examples 1 and 2 (MIDSOL 50). The second sample was the TPS made in Example 2. The lab developed a method to analyze the molecular weight of the starch in the two materials.

Solutions comprising the samples were prepared at approximately 0.8 mg/ml concentration using the mobile phase, DMSO+DMAC (4:1)+0.1% LiBr, as the diluent. The sample solutions were placed in an oven at 50° C. for 2 hours to aid dissolution, and then removed from the oven and permitted to acclimate to ambient temperature for 16 hours. Upon visual inspection, the samples appeared to be completely dissolved in the diluent and had not precipitated out at room temperature. All samples were filtered with a 0.45 µm nylon filter. The samples filtered easily without resistance. All samples were analyzed using a 2695 Alliance Separations Module system manufactured by Waters. The system was equipped with a polyester copolymer column set with refractive index detection. A series of narrow pullulan standards were used for calibration. The calibration standards ranged from 180 to 1.22M Daltons. The results of the molecular weight testing are provided in Table 2.

TABLE 2

| Sample | Mn (Daltons) | Mw (Daltons) | Mp (Daltons) | PDI (Mw/Mn) |
|---|---|---|---|---|
| Starch alone (MIDSOL 50) | 268,900 | 563,800 | 575,000 | 2.1 |
| TPS (Example 2) | 277,000 | 561,100 | 574,900 | 2.0 |

Mn = number average molecular weight;
Mw = weight average molecular weight;
Mp = molecular weight at the highest point;
PDI = Polydispersity index (Mw/Mn)

As can be seen, the change in molecular weight before and after processing was minimal. The starch contained within the TPS material showed a slight increase in Mn of 3%. The Mw of the starch contained within the TPS material showed a decrease of 0.5%. The Mp of the starch contained within the TPS material was nearly identical to that of the native starch, as was the PDI. These results demonstrate that the process of preparing the TPS did not cause any significant damage to the molecular weight of the starch.

Physical Property Evaluation

The physical properties of a thermoplastic starch as prepared in Example 2 were compared with those of a sample of thermoplastic starch made with a conventional twin screw extruder, that is, without use of the elongate mixer upstream of the extruder (CTPS). Both thermoplastic starches comprised the same components. The thermoplastic starches were then compounded with the biodegradable polyester, polybutylene adipate terephthalate or PBAT, obtained from BASF and known under the tradename ECOFLEX.

The compounding was done on a 35 mm twin screw extruder. The feed zone of the barrel was heated to 380° F., while the rest of the barrel zones were at 360° F. The screw speed was 220 rpm, and the total feed rate of the ingredients was 60 lbs/hr. The formula for both compounded materials was 70% PBAT and 30% TPS.

The resulting compounds were injection molded into standard tensile bars and then tested for tensile properties. The results of the testing are provided in Table 3.

TABLE 3

| Sample | Modulus (psi) | Elongation at Break (%) | Stress at Break (psi) | Stress at Yield (psi) |
|---|---|---|---|---|
| TPS from Example 2 | 14,804 | 339 | 1,611 | 1,252 |
| CTPS | 10,665 | 198 | 1,275 | 920 |

As the above data shows, there are significant differences in the two materials. The TPS from Example 2 shows higher modulus, elongation, break stress and yield stress than the conventionally made CTPS indicating that the TPS from Example 2 can produce a stronger, yet more elastic, material.

Tensile tests were also conducted for the samples from Example 1 and Example 3. As before, the TPS samples were compounded into PBAT at a 30% TPS to 70% PBAT ratio, using the processing condition noted above.

Referring to the Examples, above, the main differences between the TPS of Examples 1-3 are as follows. The TPS from Example 1 was made with native wheat starch and contained 30% glycerin and 15% water. The TPS from Example 2 was also made with native wheat starch, but contained 20% glycerin and 10% water. The TPS from Example 3 also was made with 20% glycerin and 10% water, but included pre-cooked wheat starch instead of native starch. Thus, the effects of higher liquid levels on the TPS material can be observed by comparing Examples 1 and 2. In addition, the level of gelatinization achieved in the mixing step can be determined by comparison with the pre-gelatinized starch in Example 3. Lower strength and elasticity should indicate a lower degree of gelatinization. The results are shown in Table 4.

TABLE 4

| TPS Sample | Modulus (psi) | Elongation at Break (%) | Stress at Break (psi) | Stress at Yield (psi) |
|---|---|---|---|---|
| Example 1 | 7,194 | 470 | 1,594 | 900 |
| Example 2 | 14,804 | 339 | 1,611 | 1,252 |
| Example 3 | 14,949 | 324 | 1,691 | 1,229 |

The data shows that the higher liquid levels of the TPS from Example 1 created a composite that was much less rigid and more elastic than that of the TPS from Example 2 and Example 2, as the liquid acts a plasticizer in the TPS. Also, the nearly identical results of the TPS from Examples 2 and 3 show that the level of gelatinization of the native starch in the mixer was as close to 100% as the pre-gelatinized starch.

Example 4

In this example, TPS materials were made from wheat starch (MIDSOL 50 from MGP Ingredients), glycerin (99.7% industrial/technical grade from KIC Group), and water. The components were mixed and extruded using a continuous mixer and a single screw extruder, Model 2FR from Technical Process and Engineering, Inc. The mixer configuration is generally described in U.S. Pat. No. 7,350,960. The dry components were added to the continuous mixer using a loss-in-weight powder feeder from Ktron. The water was added using a peristaltic pump for liquids.

The temperature of the continuous mixer was set at 180° F. at the feed section and 190° F. at the discharge. The screw speed was set at 300 RPMs. The rotors used in the mixer were low-shear TPEI #7 rotors. The glycerin and the water were mixed together at a 67% glycerin, 33% water ratio to form a solution. The starch was fed into the mixer at 30 lbs/hr, and the liquid solution at 20 lbs/hr. The resulting mixture comprised 60% by weight starch, 26.8% by weight glycerin, and 13.2% by weight water.

This mixture passed through the continuous mixer at the above conditions and exited as a continuous melt rope. The specific energy of the mixer was calculated to be about 64 watt*hours per kilogram at these conditions. The temperature of the melt rope was 165° F. The melt rope was directed into the single screw extruder with a 3:1 compression ratio screw. The single screw extruder was set at 180° F. to 190° F. on the barrel and 200° F. at the die. The screw speed was 10 RPMs. The thermoplastic starch was extruded into strands that were then strand pelletized without using a water bath.

Molecular Weight Evaluation

In order to determine if any major change in molecular weight occurred due to the TPS manufacturing process, two samples were sent to an independent lab for testing. The first sample was the raw wheat starch used in this example. The second sample was the TPS made in this example. The method used by the lab to analyze the molecular weight of the starch in the two materials is described in Example 3, above. The results of the molecular weight testing are provided in Table 5.

TABLE 5

| Sample | Mn (Daltons) | Mw (Daltons) | Mp (Daltons) | PDI (Mw/Mn) |
|---|---|---|---|---|
| Starch alone (MIDSOL 50) | 260,500 | 907,300 | 1,229,300 | 3.5 |
| TPS (Example 4) | 254,100 | 1,128,600 | 841,100 | 4.4 |

The results of this example show that the total energy input to the TPS materials in the mixer could be reduced (as indicated by rope temperature exiting the mixer), as compared to previous examples, but achieve similar molecular weight profiles.

Example 5

In this example, TPS materials were made from wheat starch (MIDSOL 50 from MGP Ingredients), glycerin (99.7% industrial/technical grade from KIC Group), and water. The components were mixed and extruded using a continuous mixer and a single screw extruder, Model 2FR from Technical Process and Engineering, Inc. The mixer configuration is generally described in U.S. Pat. No. 7,350,960. The dry components were added to the continuous mixer using a loss-in-weight powder feeder from Ktron. The water was added using a peristaltic pump for liquids.

The temperature of the continuous mixer was set at 140° F. at the feed section and 195° F. at the discharge. The screw speed was set at 950 RPM. The rotors used were low-shear TPEI #7 rotors. The glycerin and the water were mixed together at a 67% glycerin, 33% water ratio to form a solution. The starch was fed into the mixer at 120 lbs/hr and the liquid solution at 80 lbs/hr. The resulting mixture comprised 60% by weight starch, 26.8% by weight glycerin, and 13.2% by weight water.

This mixture passed through the continuous mixer at the above conditions and exited as a continuous melt rope. The specific energy of the mixer was calculated to be about 64 watt*hours per kilogram at these conditions. The melt rope then entered into a single screw extruder with a 3:1 compression ratio screw. The temperature of the single screw extruder was set at 200° F. to 220° F. on the barrel and 220° F. at the die. The screw speed was 35 RPM. The thermoplastic starch was extruded into strands that were then strand pelletized without using a water bath.

Molecular Weight Evaluation

In order to determine if any major change in molecular weight occurred due to the TPS manufacturing process, two samples were sent to an independent lab for testing. The first sample was the raw wheat starch used in this example. The second sample was the TPS made in this example. The method used by the lab to analyze the molecular weight of the starch in the two materials is described in Example 3, above. The results of the molecular weight testing are provided in Table 6.

TABLE 6

| Sample | Mn (Daltons) | Mw (Daltons) | Mp (Daltons) | PDI (Mw/Mn) |
|---|---|---|---|---|
| Starch alone (MIDSOL 50) | 245,000 | 847,800 | 1,005,600 | 3.5 |
| TPS (Example 4) | 254,100 | 1,128,600 | 841,100 | 4.4 |

The results of this example demonstrate that the process can be scaled up (increasing the throughput from 50 lbs/hr as in Example 4 to 200 lbs/hr in this example) without affecting the molecular weight profile of the materials.

We claim:

1. A process for producing thermoplastic starch comprising:
    mixing within a continuous mixer a composition comprising starch a plasticizer, and water, the mixing step including operating the mixer at a temperature of from about 150° F. to about 200° F. and at a pressure of less than 3 bar so as to gelatinize the starch and form a melt;
    discharging the melt from the continuous mixer and feeding the melt into an extruder;
    operating the extruder at a temperature of from about 150° F. to about 250° F.; and
    extruding the melt through a die at a die pressure of from about 1500 psi to about 2500 psi.

2. The process of claim 1, wherein the plasticizer is selected from the group consisting of glycerin, citric acid-based plasticizers, modified or unmodified vegetable oils, and fatty acids.

3. The process of claim 2, wherein the plasticizer is glycerin.

4. The process of claim 1, wherein the starch is selected from the group consisting of native or modified wheat starch, native or modified corn starch, and native or modified potato starch.

5. The process of claim 1, wherein the continuous mixer comprises an elongate twin-screw mixer.

6. The process of claim 5, wherein each of the mixer screws comprises a Lowenherz thread flight located upstream from a standard screw flight.

7. The process of claim 5, wherein the continuous mixer has a compression ratio of about 3:1.

8. The process of claim 1, wherein the shear rate during mixing is from about 590 $s^{-1}$ to about 280 $s^{-1}$.

9. The process of claim 1, wherein the melt is discharged from the continuous mixer as a rope.

10. The process of claim 1, wherein one or more additional solid or liquid ingredients are added to the continuous mixer along with the starch, plasticizer, and water.

11. The process of claim 10, wherein the one or more additional solid or liquid ingredients are selected from the group consisting of glycerol monostearate, metal stearates, internal or external lubricants, natural fibers, fillers, reinforcing materials, additional starch having a higher or lower molecular weight than the starch, and sugars.

12. The process of claim 1, wherein one or more lubricants and/or additional plasticizers are added to the melt within the extruder.

13. The process of claim 1, further comprising pelletizing the extruded melt upon exiting the extruder die.

14. The process of claim 1, wherein the extruder die is configured to form the melt into a sheet or film.

15. The process of claim 1, wherein the mixing and extruding steps do not substantially alter the molecular weight of the starch as added to the mixer.

16. A process for producing thermoplastic starch comprising:
   mixing within a twin-screw, heated continuous mixer a composition comprising a non-pregelatinized native or modified starch, glycerin, water, the mixing step including operating the mixer at a temperature of from about 150° F. to about 200° F. and at a pressure of less than 3 bar so as to gelatinize the starch and form a melt;
   discharging the melt from the continuous mixer as a rope and feeding the melt directly into a single screw extruder;
   operating the single screw extruder at a temperature of from about 150° F. to about 250° F.; and
   extruding the melt through a die at a die pressure of from about 1500 psi to about 2500 psi,
   wherein the mixing and extruding steps do not substantially change the molecular weight of the starch as added to the mixer.

17. The process of claim 1, wherein the composition comprises from about 50% to about 75% by weight of the starch, from about 15% to about 30% by weight of the plasticizer, and from about 5% to about 20% by weight of the water.

18. The process of claim 1, wherein the amount of mechanical energy input to the components within the mixer is from about 75 to about 150 Wh/kg.

19. The process of claim 16, wherein the composition comprises from about 50% to about 75% by weight of the non-pregelatinized native or modified starch, from about 15% to about 30% by weight of the glycerin, and from about 5% to about 20% by weight of the water.

20. The process of claim 16, wherein the shear rate during mixing is from about 590 $s^{-1}$ to about 280 $s^{-1}$.

* * * * *